UNITED STATES PATENT OFFICE.

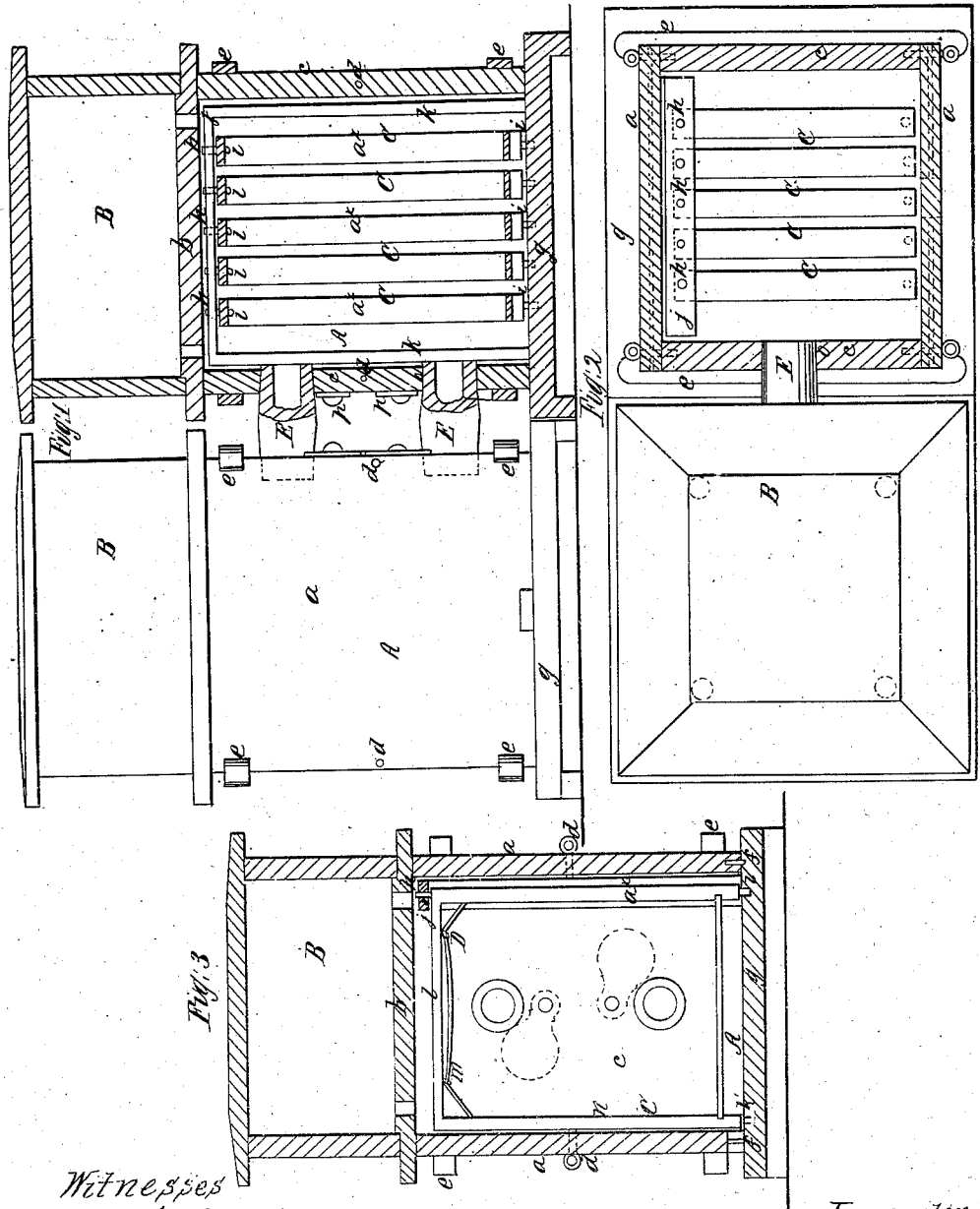

F. R. WALKER, OF WATERFORD, PENNSYLVANIA.

BEEHIVE.

Specification of Letters Patent No. 32,259, dated May 7, 1861.

*To all whom it may concern:*

Be it known that I, F. R. WALKER, of Waterford, in the county of Erie and State of Pennsylvania, have invented a new and Improved Beehive; and I do hereby declare that the following is a full, clear, and exact description of the same, reference being had to the annexed drawings, making a part of this specification, in which—

Figure 1 is a front view of my invention, two hives being shown connected and one of them bisected vertically. Fig. 2 a plan or top view of the same, with one hive bisected horizontally. Fig. 3 a vertical section of a single hive the plane of section being at right angles to that of the bisected hive in Fig. 1.

Similar letters of reference indicate corresponding parts in the several figures.

The object of this invention is to pivot the comb frames in the hives in such a manner that the pivots will not be accessible to the bees, and the latter be thereby prevented from covering the pivots with wax, a contingency which prevents the swinging out of the comb-frames when it is desired to examine the combs and remove a portion or the whole of the same.

The invention also has for its object the aiding of the bees in guiding the comb, during its construction, so that the latter will be built in the same planes with the frames; and the combs of the several frames kept separate.

To enable those skilled in the art to fully understand and construct my invention I will proceed to describe it.

A. represents the body of the hive which may be of quadrilateral form, the front and back $a$, $a$, being secured at their upper ends to the top $b$, of the hive, and the sides $c$, $c$, fitted between the front and back and secured by pins $d$, $d$, the sides $c$, $c$, being provided with clamp bars $e$, $e$, the ends of which hook over the edges of the front and back, as shown clearly in Fig. 2. This arrangement admits of the ready removal of the sides $c$, $c$, in order to take out the comb frames hereinafter described. The lower edges of the front and back $a$, $a$, are slotted and fit on cleats $f$, $f$, on the bottom board $g$. see Fig. 3. The hives A. may be supplied with a spare honey box B. arranged in the usual way.

C. represents the comb frames which are of rectangular form and are secured within the hive A. by pivots $h$, $i$, the pivots $h$, being at the upper ends of the frames at one side and the pivots $i$, at the lower ends, in vertical lines with the upper ones see Fig. 2. The upper pivots $h$, enter a horizontal bar $j$, in the upper part of the hive, said bar being attached to the upper ends of uprights $k$, $k$, shown clearly in Fig. 1. The pivots $h$, also pass into the back uprights $a^*$, of the comb frames directly under bar $j$. The lower pivots $i$, pass directly into the bottom board $g$, of the hive. By this arrangement it will be seen that the pivots are not accessible to the bees and they therefore can not be smeared with wax so as to prevent or retard the frames C. turning thereon, a contingency which would occur if the pivots were exposed, and which renders the swinging and removal from the hives of the frames hitherto used a matter of some difficulty. The frames when in proper position in the hive are prevented from casually moving or turning by means of pins $k'$, at the lower and front ends of the comb frames, said pins fitting in the bottom board $g$, of the hive, as shown in Fig. 3.

To the under side of the top pieces $l$, of the comb frames there are attached wires D., one to each top piece. These wires are secured longitudinally to the top pieces $l$, by staples $m$, $m$, and the ends of the wires project down obliquely from the top pieces and enter the uprights $n$, $a^*$, of the comb frames a short distance below the top pieces as shown clearly in Fig. 3. These wires thus arranged serve as guides for the bees in constructing their combs, the bees commencing from the top pieces $l$, and building downward. The wires insure the upper parts of the comb being built in the same planes with the top pieces, and when thus properly commenced the comb will be properly finished, that of one frame not interfering or coming in contact with that of the other. These wires D. may be applied with great facility and at a trifling expense and will also serve in a measure as braces for the frames.

One side $c$, of the hive has two circular openings $o$, $o$. These openings are provided with covers $p$, $p$, by which the openings may be closed when not desired for use. These openings $o$, $o$, are for the purpose of receiving the ends of tubes E. which form a communication between two hives, the tubes being applied for the purpose of introducing a swarm of bees, from a filled or old hive, into an empty hive and thereby prevent the usual swarming in the open air and obviate the trouble and embarrassment attending the gathering and introducing of them into a proper hive.

I do not claim broadly the employment or use of swinging or hinged comb frames for bee hives, for they have been used; but, I do claim as new and desire to secure by Letters Patent, 1. The arrangement of the pins $h$ $i$ and $k'$ in combination with the supporting frame $j$ $k$ $k$ and comb frames C, the whole being constructed and employed, in the manner herein shown and explained to permit the comb frames to swing or secure them in position without exposing the pins.

2. The wires or comb-guides D. attached to the under sides of the top pieces $l$, of the comb frames, as and for the purpose specified.

F. R. WALKER.

Witnesses:
 BENJAMIN GRANT,
 M. BENSON.